(12) United States Patent
Gotou

(10) Patent No.: US 8,804,543 B2
(45) Date of Patent: Aug. 12, 2014

(54) TEST METHOD FOR NETWORK SYSTEM

(75) Inventor: Kazunari Gotou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 390 days.

(21) Appl. No.: 13/076,090

(22) Filed: Mar. 30, 2011

(65) Prior Publication Data

US 2011/0242993 A1 Oct. 6, 2011

(30) Foreign Application Priority Data

Mar. 31, 2010 (JP) ................................ 2010-080266

(51) Int. Cl.
*H04L 12/26* (2006.01)

(52) U.S. Cl.
USPC .......................................... 370/250; 370/249

(58) Field of Classification Search
USPC .......... 709/205, 217, 223; 370/241–253, 389, 370/412, 428; 379/1.01–32.05; 710/22
See application file for complete search history.

(56) References Cited

U.S. PATENT DOCUMENTS

| | | | | |
|---|---|---|---|---|
| 4,486,877 A | * | 12/1984 | Turner | 370/249 |
| 4,685,102 A | * | 8/1987 | Lewis | 370/249 |
| 4,942,569 A | * | 7/1990 | Maeno | 370/230 |
| 5,563,875 A | * | 10/1996 | Hefel et al. | 370/249 |
| 6,377,583 B1 | * | 4/2002 | Lyles et al. | 370/412 |
| 6,901,491 B2 | * | 5/2005 | Kohn et al. | 711/157 |
| 7,383,312 B2 | * | 6/2008 | Biran et al. | 709/212 |
| 8,174,991 B1 | * | 5/2012 | Trivedi | 370/241 |
| 2007/0014232 A1 | * | 1/2007 | Yasuie et al. | 370/216 |
| 2007/0016590 A1 | * | 1/2007 | Appleby et al. | 707/10 |
| 2008/0013561 A1 | | 1/2008 | Shimizu | |

FOREIGN PATENT DOCUMENTS

| | | |
|---|---|---|
| JP | 8-18570 | 1/1996 |
| JP | 2004-240980 | 8/2004 |

* cited by examiner

*Primary Examiner* — Andrew Chriss
*Assistant Examiner* — Jose Perez
(74) *Attorney, Agent, or Firm* — Staas & Halsey LLP

(57) ABSTRACT

A load test method for a network system in which a plurality of node devices exchange packets via a first switch device by way of a second switch device, includes transmitting a plurality of first packets to the first switch device by a first node device, the plurality of first packets being addressed to the first node device via the second switch device, transmitting a plurality of second packets to the first switch device by a second node device, the plurality of second packets being addressed to the first node device via the first switch device, storing the first packets and the second packets in a queue buffer and thereafter transferring the first packets and the second packets to the first node device by the first switch device, and monitoring state information based on the number of packets waiting to be exchanged in the second switch device.

6 Claims, 15 Drawing Sheets

TEST METHOD FOR NETWORK SYSTEM

CROSS-REFERENCE TO RELATED APPLICATION

This application is based upon and claims the benefit of priority of the prior Japanese Patent Application No. 2010-80266, filed on Mar. 31, 2010, the entire contents of which are incorporated herein by reference.

FIELD

The embodiments discussed herein are related to a test method for a network system.

BACKGROUND

A high-speed serial interconnection is recommended as networks have become larger in recent years. In order to achieve such an interconnection, it is common to construct a network environment in which a large number of nodes are connected via network switches. A load test is known as a test method for such a network environment. In a load test according to the related art, a load is simulatively created by adjusting the packet size and the transfer time interval.

Japanese Laid-open Patent Publication Nos. 8-18570 and 2004-240980 are examples of related art.

In a packet-adjusting load test, however, the network system can control a waiting queue during normal transfer, and therefore it is difficult to create a state in which packets reside in a queue, and thus to create a practically high load.

SUMMARY

A load test method for a network system in which a plurality of node devices exchange packets via a first switch device by way of a second switch device, includes: transmitting a plurality of first packets to the first switch device by a first node device, the plurality of first packets being addressed to the first node device via the second switch device; transmitting a plurality of second packets to the first switch device by a second node device, the plurality of second packets being addressed to the first node device via the first switch device; storing the first packets and the second packets in a queue buffer and thereafter transferring the first packets and the second packets to the first node device by the first switch device; and monitoring state information based on the number of packets waiting to be exchanged in the second switch device.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

DESCRIPTION OF EMBODIMENTS

An exemplary embodiment will be described below in the order of a network system, a test method for the network system, and a transfer test process, followed by other embodiments. However, the network system, the nodes, and the switches according to the present invention are not limited to those of the embodiment.

(Network System)

Figure 1:
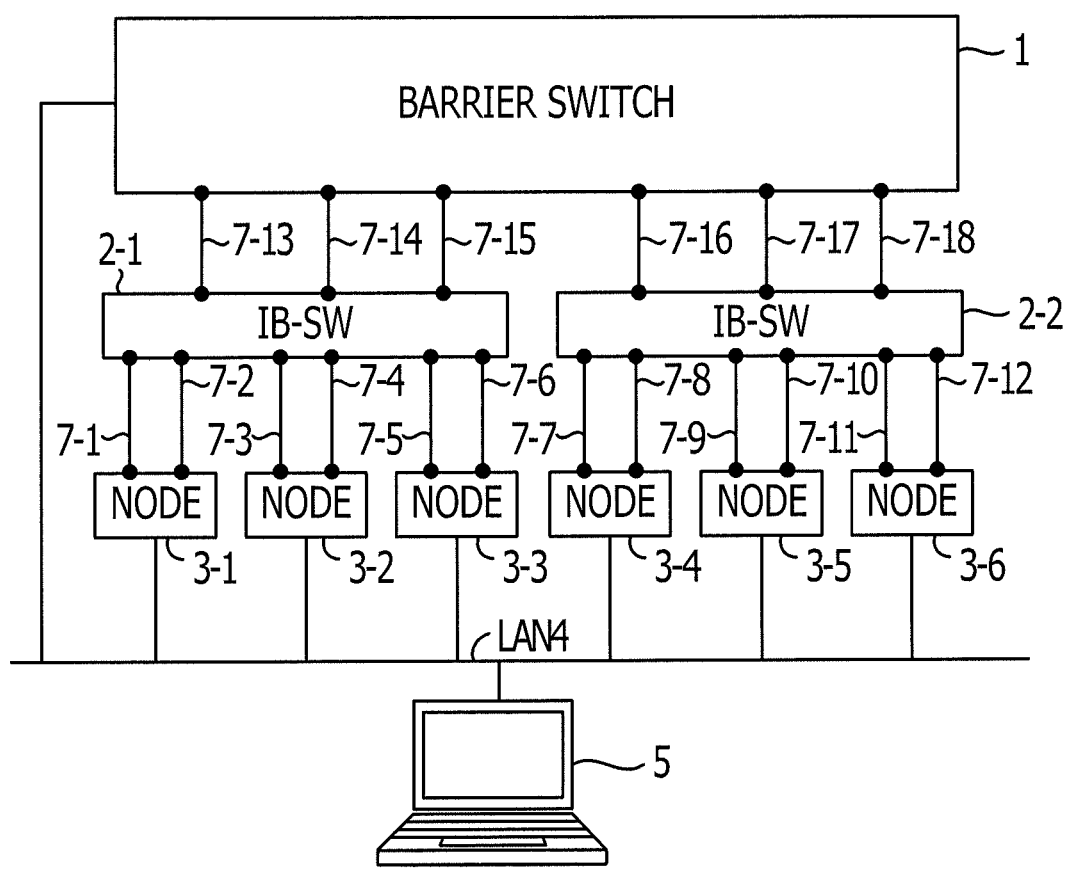
FIG. 1 illustrates the configuration of a network system according to an embodiment.
Figure 2:
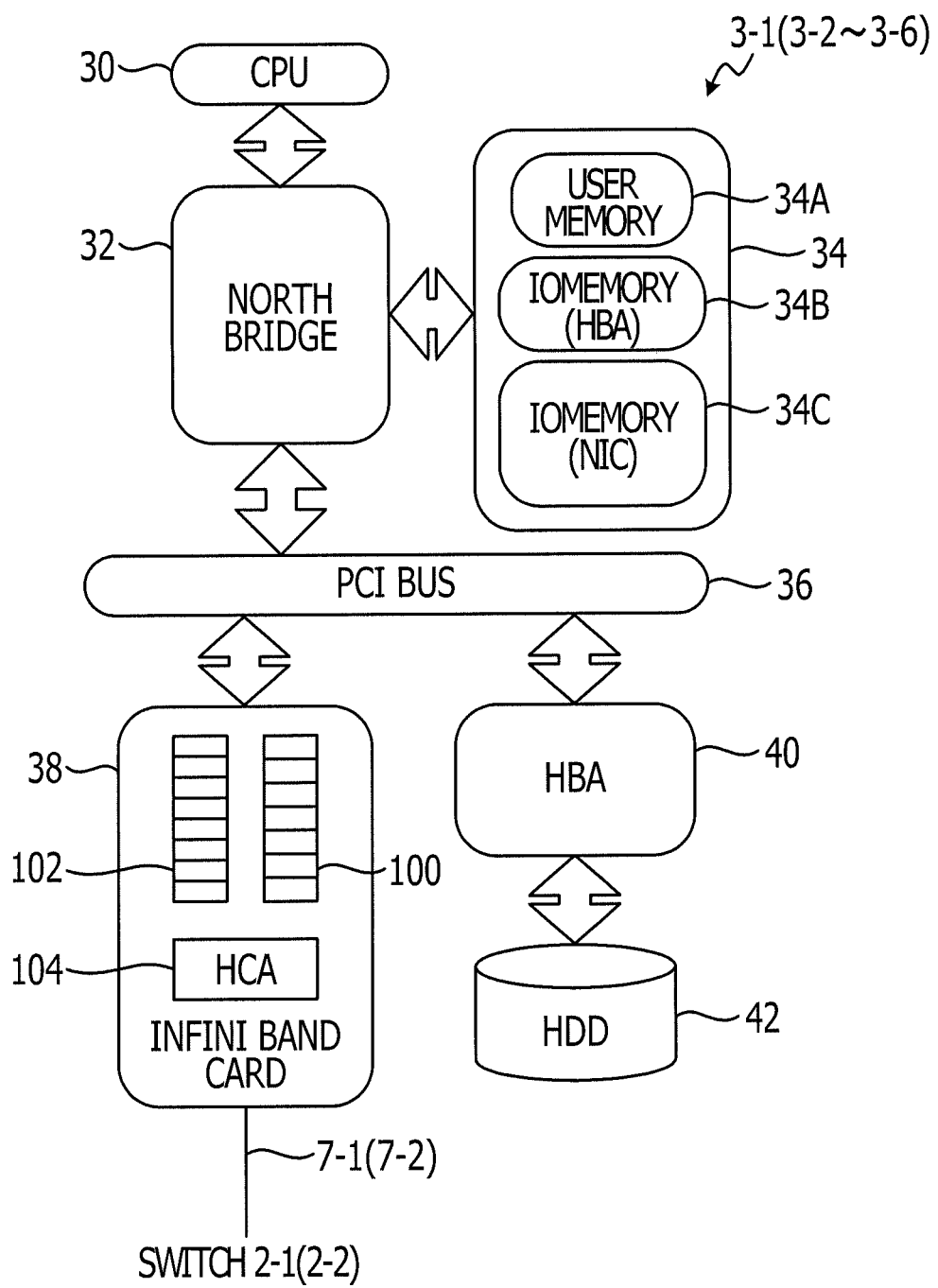
FIG. 2 is a block diagram of a node of FIG. 1.
Figure 3:
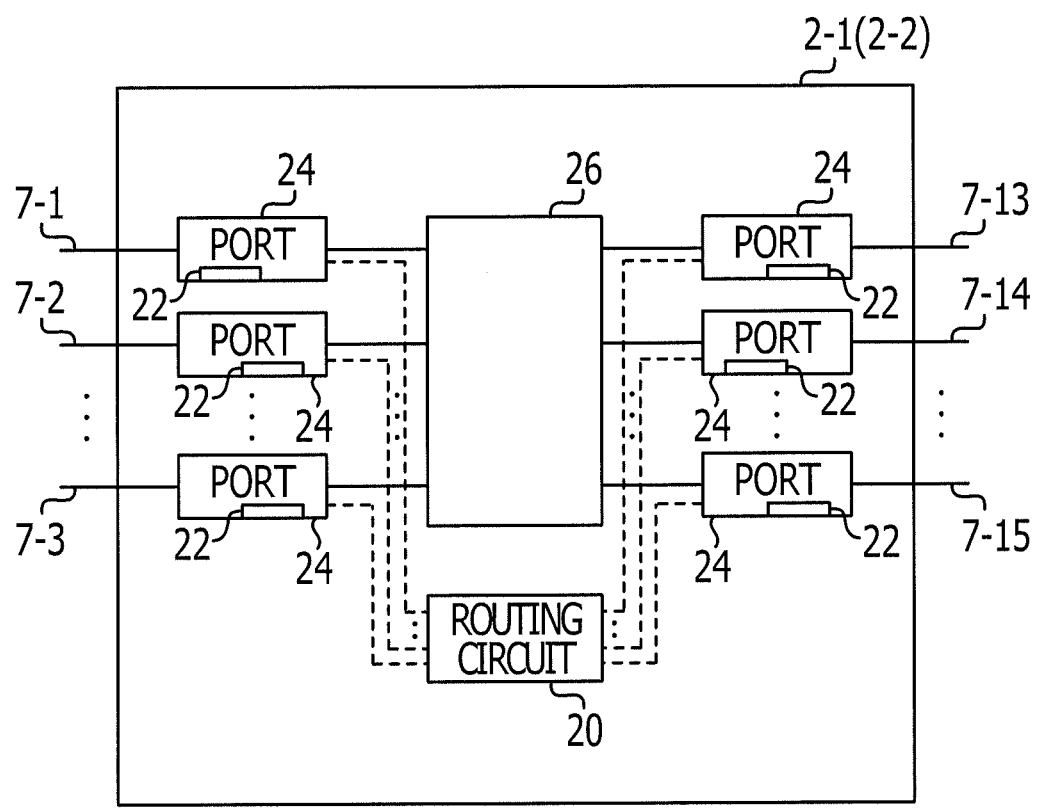
FIG. 3 illustrates the configuration of a first switch (IB-SW) of FIG. 1.
Figure 4:
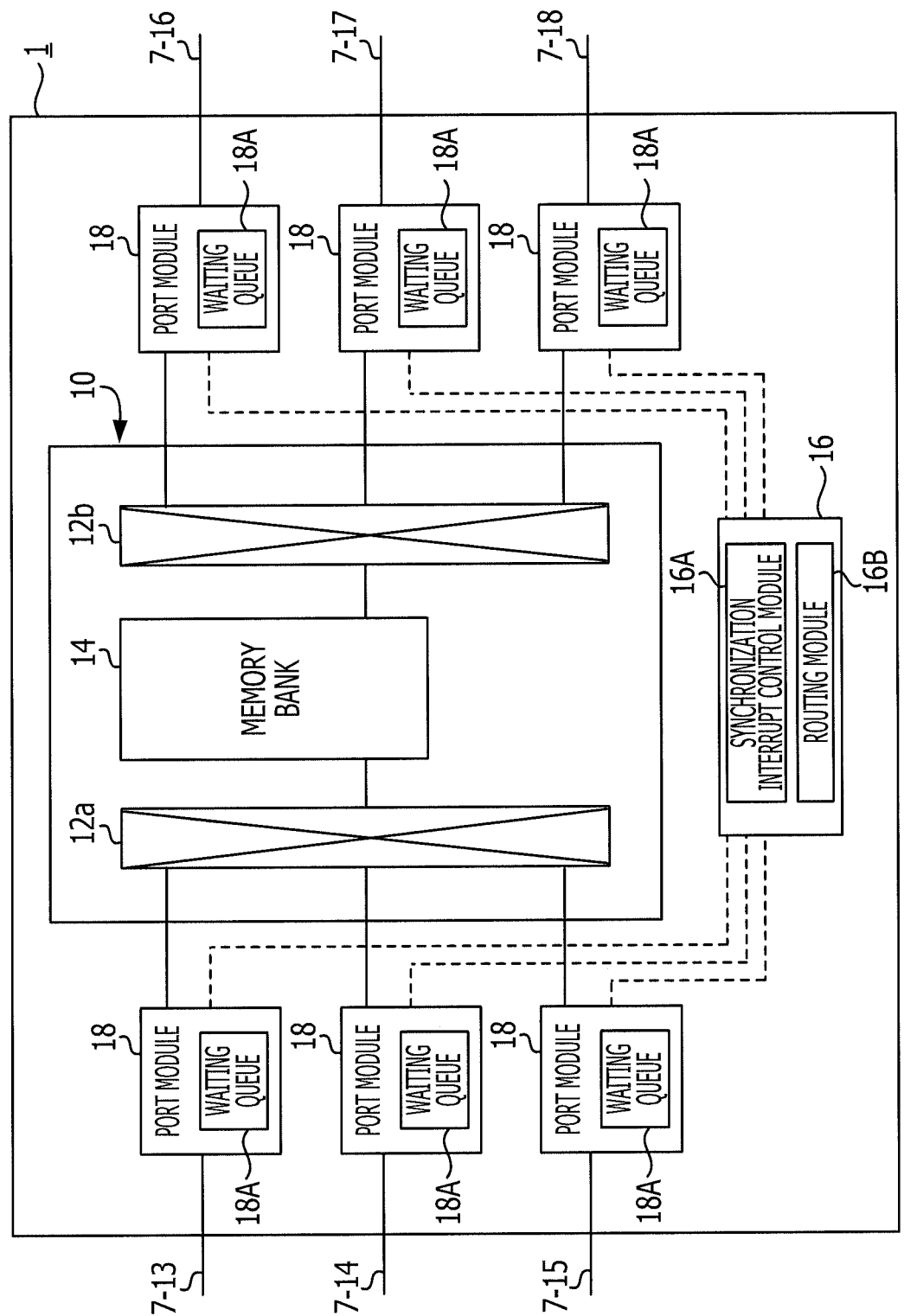
FIG. 4 illustrates the configuration of a second switch (BARRIER SWITCH) of FIG. 1.

FIG. 1 illustrates the configuration of a network system according to the embodiment. FIG. 2 is a block diagram of a node of FIG. 1. FIG. 3 illustrates the configuration of a first switch (IB-SW) of FIG. 1. FIG. 4 illustrates the configuration of a second switch (BARRIER SWITCH) of FIG. 1.

As illustrated in FIG. 1, a network system includes a large number of (in FIG. 1, six) node devices (hereinafter referred to as "nodes") 3-1 to 3-6, a plurality of (in FIG. 1, two) first switch devices (identified as "IB-SWs") 2-1 and 2-2, and a second switch device (identified as a "barrier switch") 1.

One of the first switch devices (hereinafter referred to as a "first switch"), 2-1, is connected to each of a plurality of the nodes, 3-1 to 3-3, via signal lines (referred to as "links") 7-1 to 7-6, and connected to the second switch device (hereinafter referred to as a "second switch") 1 via signal lines (links) 7-13 to 7-15. The other of the first switch devices, 2-2, is connected to each of the others of the nodes, 3-4 to 3-6, via signal lines 7-7 to 7-12, and connected to the second switch 1 via signal lines (links) 7-16 to 7-18.

Thus, the nodes 3-1 to 3-3 transfer packets to each other using the one 2-1 of the first switches, and transfer packets to the nodes 3-4 to 3-6 via the one 2-1 of the first switches, the second switch 1, and the other 2-2 of the first switches.

Likewise, the nodes 3-4 to 3-6 transfer packets to each other using the other 2-2 of the first switches, and transfer packets to the nodes 3-1 to 3-3 via the other 2-2 of the first switches, the second switch 1, and the one 2-1 of the first switches.

The nodes 3-1 to 3-6 are each formed by a server, an I/O (input/output) unit, or the like. The first switches 2-1 and 2-2 are each formed by an INFINIBAND (registered trademark) switch (IB-SW) or an Ethernet (registered trademark) switch. In the description below, the first switches 2-1 and 2-2 are each an INFINIBAND (registered trademark) switch. However, the first switches 2-1 and 2-2 formed by an ETHERNET (registered trademark) switch with RDMA (Remote Direct Memory Access) and TCP Offload Engine (TOE) can also operate in the same way as the first switches 2-1 and 2-2 formed by an INFINIBAND (registered trademark) switch.

In the case where the first switches 2-1 and 2-2 are each formed by an INFINIBAND (registered trademark) switch, the first switches 2-1 and 2-2 are connected to the nodes 3-1 to 3-6 and the second switch 1 through INFINIBAND (registered trademark) links (IB links) 7-1 to 7-18.

The second switch 1 is formed by an INFINIBAND (registered trademark) switch. The second switch 1 executes not only an exchange function but also a synchronization interrupt function for inter-node barrier synchronization, a reduction operation, and OS scheduling. In the inter-node barrier synchronization, results of processes performed at respective nodes are kept waiting until a synchronization point for parallel processing is reached. The second switch 1 receives packets transferred from the respective nodes, performs a waiting process, and transmits the packets to different nodes using the inter-node barrier function.

The exemplary network system of FIG. 1 discloses an HPC (High Performance Computing) system with several thousands of nodes. In the HPC system, the respective nodes execute a job in parallel, and transfer job results to each other via the switches 1, 2-1, and 2-2. The synchronization interrupt function of the second switch 1 synchronizes user jobs between the large number of nodes, and serves to enhance the efficiency in executing parallel jobs.

In order to allow exchange of packets between the large number of nodes, the system of FIG. 1 is provided with a multi-level switch structure and the second switch 1 is provided with a synchronization interrupt function to improve the efficiency in executing parallel computing.

In FIG. 1, in addition, a LAN (Local Area Network) 4 connects each of the nodes 3-1 to 3-6, the second switch 1, and the terminal device 5. The terminal device 5 loads a test program into each of the nodes 3-1 to 3-6 via the LAN 4 to start up each of the nodes 3-1 to 3-6. The terminal device 5 also reads the content of a buffer, such as a waiting queue, of the second switch 1 via the LAN 4. A personal computer (PC) may be used as the terminal device 5, for example.

The nodes 3-1 to 3-6 of FIG. 1 will be described with reference to FIG. 2. As illustrated in FIG. 2, the nodes 3-1 to 3-6 are each formed by an information processing device. The nodes 3-1 to 3-6 each include a central processing unit (CPU) 30, a host memory 34 used by the central processing unit (hereinafter referred to as a "CPU") 30, a bridge circuit (identified as a "North Bridge") 32, and a network interface card (NIC) 38 and a host bus adapter (HBA) 40 connected to the bridge circuit 32 through a bus 36.

A storage device 42 is connected to the host bus adapter 40. The storage device 42 is preferably a hard disk device, for example. The bus 36 is preferably a PCI (Peripheral Component Interconnect) bus, for example. The bridge circuit 32 is formed as an interconnect circuit between the CPU 30, the host memory 34, the network interface card (hereinafter referred to as an "NIC") 38, and the host bus adapter (hereinafter referred to as an "HBA") 40, and may be a PCI switch, for example.

The host memory 34 includes a user memory 34A used by a user, a first I/O memory 34B used by the HBA 40, and a second I/O memory 34C used by the NIC 38. The user memory 34A and the first and second I/O memories 34B and 34C are integrated with each other as hardware.

The NIC 38 is formed by an INFINIBAND (registered trademark) card. However, the NIC 38 may be formed by an ETHERNET (registered trademark) card that complies with the ETHERNET (registered trademark) standard with RDMA (Remote Direct Memory Access) and TCP Offload Engine (TOE) as discussed earlier.

The NIC 38 includes a transmission queue buffer 100, a reception queue buffer 102, and a host channel adapter (HCA) 104. The host channel adapter (hereinafter referred to as an "HCA") 104 transmits and receives packets to and from the first switch 2-1 (2-2) via the link 7-1 (7-2) in accordance with a communication standard that complies with the InfiniBand specifications. The transmission queue buffer 100 holds (queues) a work queue element (transmission request) from the CPU 30. The reception queue buffer 102 holds (queues) a reception request for received packets from the switch 2-1 (2-2). Each of the queue buffers 100 and 102 can hold a large number (for example, several tens) of queues.

In the example of FIG. 2, the information processing device is provided with one NIC 38. However, the nodes (information processing devices) 3-1 to 3-6 are each provided with two NICs 38 as indicated by the IB Links 7-1 to 7-12 from the nodes 3-1 to 3-6 to the first switches 2-1 and 2-2 of FIG. 1.

Next, the first switches 2-1 and 2-2 will be described with reference to FIG. 3. The first switches 2-1 and 2-2 are each formed by a large number of ports 24, a switch core 26, and a routing circuit 20. Each of the ports 24 is connected to the NIC 38 of a corresponding one of the nodes 3-1 to 3-3 via a corresponding one of the links 7-1 to 7-6, and connected to the second switch 1 via the links 7-13 to 7-15. Each of the ports 24 includes a transmission/reception queue buffer 22. The transmission/reception queue buffer 22 can hold a plurality of transmission and reception queue elements.

Each of the ports 24 reads a queue element in the transmission queue buffer 22. If it is determined that the read queue element is a transmission queue element, the port 24 transmits corresponding transmitted packets held at the port 24 to the NIC 38 of a corresponding node via a link. If it is determined that the read queue element is a reception queue element, the port 24 transfers the packet header of received packets to the routing circuit 20.

The switch core 26 includes a crossbar switch, and is connected to each of the ports 24. The routing circuit 20 determines a sender address, a destination address, a point through which packets are to pass, and an operation code from the transferred packet header. In the case where the packet header designates the second switch 1 as the point through which packets are to pass, the routing circuit 20 operates the switch core 26 to transfer the packets received at a port 24 to any of the ports 24 connected to the links 7-13 to 7-15. In the case where the packet header does not designate the second switch 1 as the point through which packets are to pass, meanwhile, the routing circuit 20 operates the switch core 26 to transfer the packets received at a port 24 to a port 24 connected to one of the links 7-1 to 7-6 designated as the destination address.

Next, the second switch 1 will be described with reference to FIG. 4. The second switch 1 includes a large number of ports 18, a switch core 10, and a switch control circuit 16. Each of the ports 18 is connected to a corresponding one of the ports 24 of the first switches 2-1 and 2-2 via the links 7-13 to 7-18. Each of the ports 18 includes an exchange waiting queue buffer 18A. The exchange waiting queue buffer 18A can hold a plurality of reception queue elements that have not been exchanged, of the packets received at each port.

The switch core 10 includes a first crossbar switch 12a connected to the ports 18, a second crossbar switch 12b connected to the ports 18, and a memory 14 connected to the first and second crossbar switches 12a and 12b. The memory 14 includes a memory area assigned to each of the ports 18, and temporarily stores packets received at a port 18 in the area assigned to the port 18. The memory 14 is utilized for a waiting process for synchronization interrupt control.

The switch control circuit 16 includes a synchronization interrupt control module 16A and a routing module 16B. The routing module 16B determines a sender address, a destination address, a point through which packets are to pass, and an operation code from the queue element in the exchange waiting queue buffer 18A of each port 18 and the packet header. In the case where the packet header designates the first switch 2-1 as the point through which packets are to pass, the routing module 16B operates the crossbar switch 12a to transfer the packets read from the memory 14 to any of the ports 18 connected to the links 7-13 to 7-15. In the case where the packet header designates the first switch 2-2 as the point through which packets are to pass, meanwhile, the routing module 16B operates the crossbar switch 12b to transfer the packets read from the memory 14 to any of the ports 18 connected to the links 7-16 to 7-18.

The synchronization interrupt control module 16A controls the routing module 16B. The synchronization interrupt control module 16A determines whether or not synchronization control of packets in a queue element read from the exchange waiting queue buffer 18A of each port 18 with packets from other nodes is necessary, and whether or not conditions for synchronization control of such packets with already received packets are met.

If it is determined that packet synchronization control is necessary and that the synchronization control conditions are not met, the synchronization interrupt control module 16A stores the identifier of the corresponding queue element in a register of the synchronization interrupt control module 16A, and prohibits routing operation of the routing module 16B. Therefore, the corresponding packets are held in the memory 14. That is, the synchronization interrupt control module 16A performs a waiting process.

If it is determined that packet synchronization control is necessary and that the synchronization control conditions are met, on the other hand, the synchronization interrupt control module 16A commands the routing module 16B to route packets with an identifier that meets the synchronization control conditions in the register. Consequently, the routing module 16B performs a routing process on the packets that meet the synchronization control conditions in the memory 14 as discussed earlier.

In this way, the synchronization interrupt control module 16A controls the routing module 16B so as to wait to route packets that require synchronization control and so as to route a plurality of packets, including the packets which have been kept waiting, when the synchronization control conditions are met. As discussed earlier, the memory 14 includes a memory area assigned to each of the ports 18. Therefore, if the plurality of packets which have been kept waiting exist in the memory 14, the queue element in the exchange waiting queue buffer 18A at the corresponding port is not routed by the routing module 16B, and resides in the exchange waiting queue buffer 18A. The synchronization control conditions are conditions for matching the assignment frequencies of the user time and the OS (operating system) time, for example, and can prevent inter-node synchronization operation for user jobs from being impeded for a long period and delayed by OS operation which is different between nodes.

(Test Method for Network System)

Figure 5:
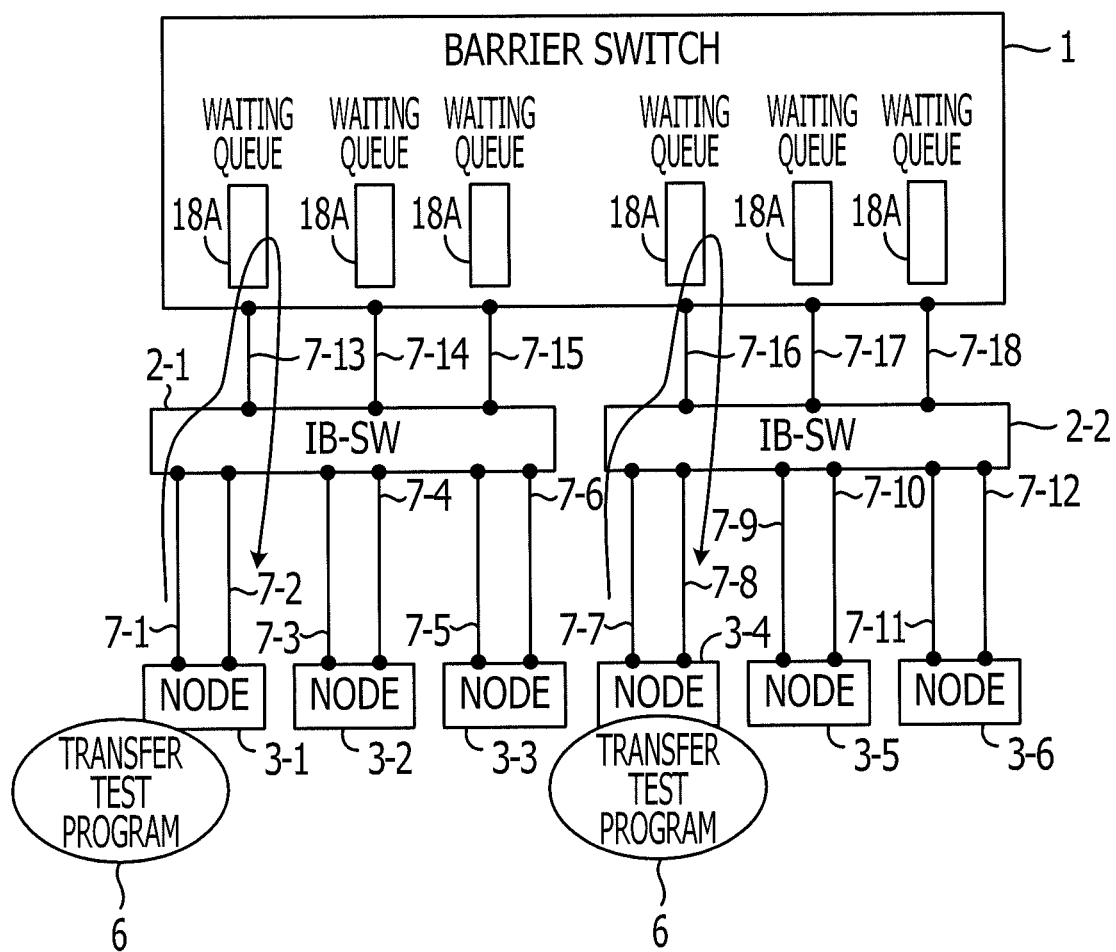
FIG. 5 illustrates a normal test of a test method for the network system according to the embodiment.
Figure 6:
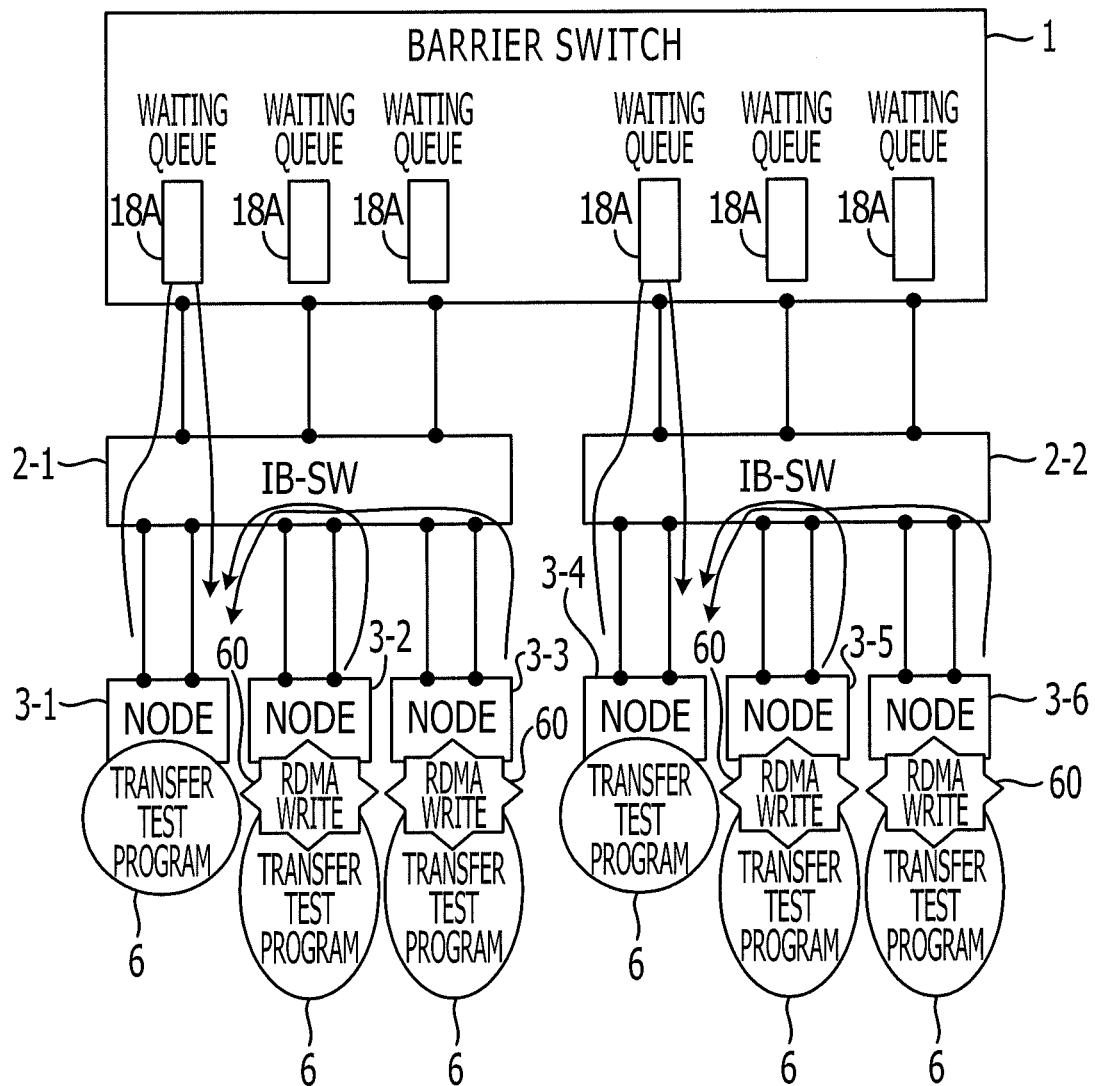
FIG. 6 illustrates RDMA Write of the test method for the network system according to the embodiment.
Figure 7:
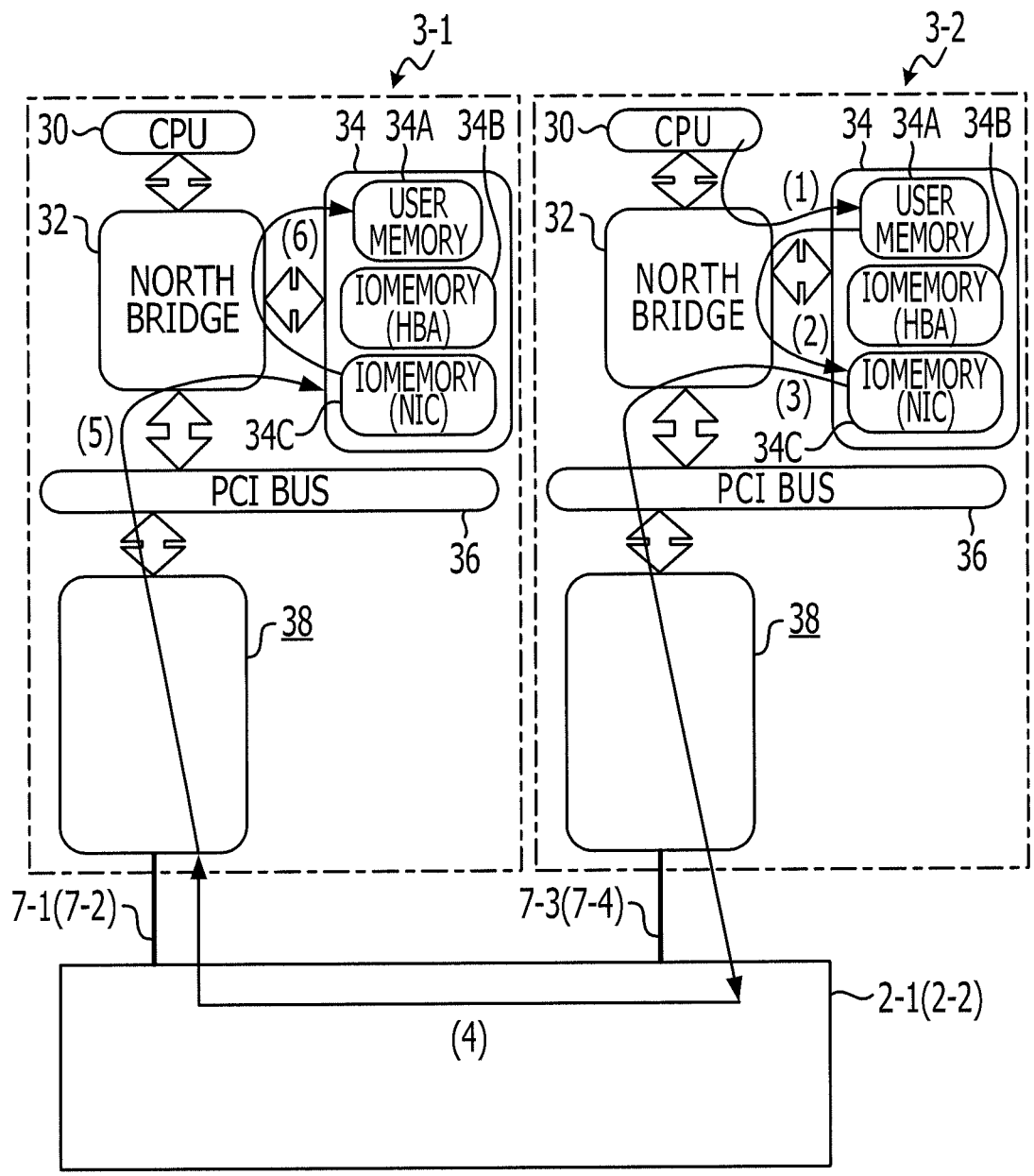
FIG. 7 illustrates normal transfer operation of FIGS. 5 and 6.
Figure 8:
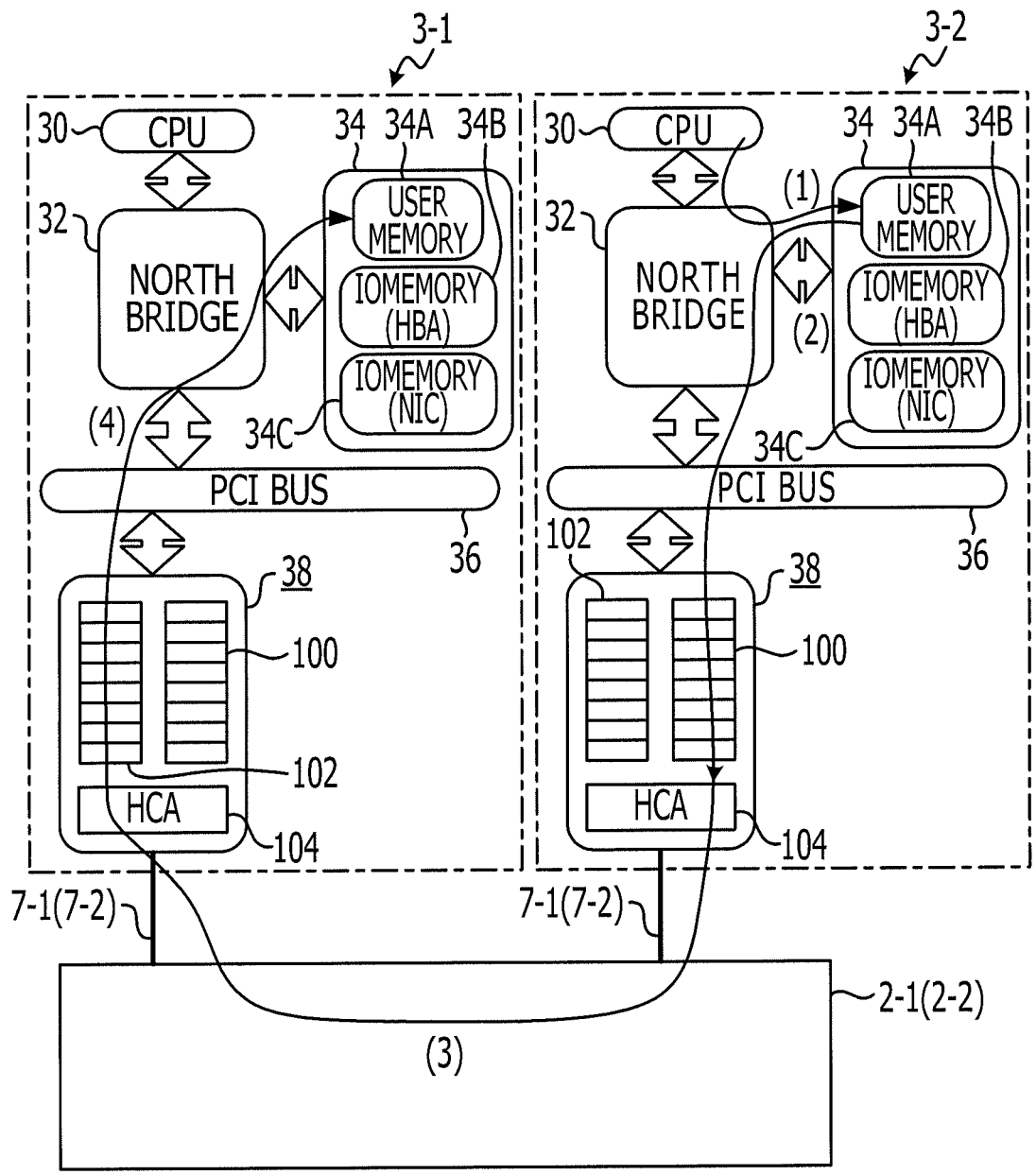
FIG. 8 illustrates RDMA transfer operation of FIG. 6.
Figure 9:
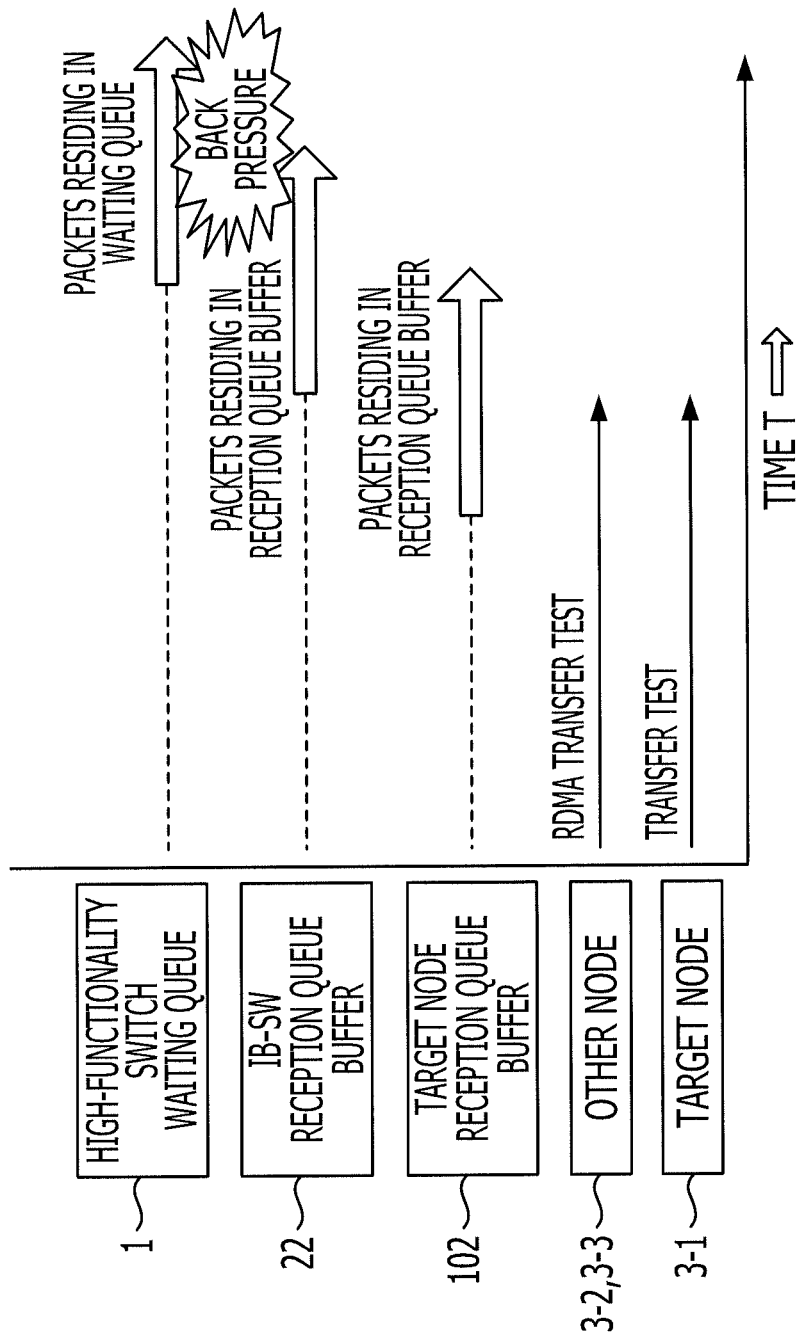
FIG. 9 illustrates operation of the test method of FIGS. 5 and 6.

Next, a load test method for a network system will be described. FIGS. 5 and 6 illustrate a test method for the network system according to the embodiment. FIG. 7 illustrates normal transfer operation of FIGS. 5 and 6. FIG. 8 illustrates RDMA transfer operation of FIG. 6. FIG. 9 illustrates operation of the test method of FIGS. 5 and 6.

Components in FIGS. 5 and 6 that are the same as those in FIGS. 1 to 4 are denoted by the same reference numerals. The subject of the load test is the second switch (barrier switch) 1.

As illustrated in FIGS. 5 and 6, a transfer test program 6 is loaded into each of the nodes 3-1 to 3-6. Then, a node serving as a target is designated. In FIG. 5, the nodes 3-1 and 3-4 are designated as target nodes. The target nodes 3-1 and 3-4 conduct a normal transfer test, and nodes other than the target nodes perform only RDMA Write.

As illustrated in FIG. 5, the target nodes 3-1 and 3-4 respectively transmit packets for normal testing to the first switches 2-1 and 2-2. The normal test packets are designated to be addressed to the corresponding target node itself, and to pass through the corresponding first switch and the second switch.

As indicated by the arrows of FIG. 5, the packets for normal testing are dispatched from either of the target nodes 3-1 and 3-4 and pass through a corresponding one of the first switches 2-1 and 2-2 to reach the second switch 1, and are dispatched from the second switch 1 and pass through a corresponding one of the first switches 2-1 and 2-2 to reach either of the target nodes 3-1 and 3-4.

In the embodiment, as illustrated in FIG. 6, the nodes 3-2, 3-3, 3-5, and 3-6, other than the target nodes 3-1 and 3-4, perform RDMA Write transfer with the target nodes 3-1 and 3-4 designated as the destination addresses (see the arrows of FIG. 6), in addition to the normal test. That is, the normal test and the RDMA transfer are executed in parallel with each other.

RDMA packet transfer and normal packet transfer will be described. FIG. 7 illustrates normal packet transfer from the node 3-2 to the node 3-1. The CPU 30 of the node 3-2 writes transfer data into the user memory 34A of the memory 34 (arrow (1) of FIG. 7). The CPU 30 of the node 3-2 writes a queue element into the transmission queue buffer 100 of the NIC 38. The transfer data in the user memory 34A is moved to the I/O memory 34C of the memory 34 (arrow (2) of FIG. 7). The HCA 104 of the NIC 38 reads the transfer data in the I/O memory 34C, assembles the transfer data into packets, and transfers the packets to the first switch 2-1 via the link 7-3 (7-4) (arrow (3) of FIG. 7). The first switch 2-1 receives the packets, discriminates the destination address of the packets, and transfers the packets to the NIC 38 of the node 3-1 via the link 7-1 (7-2) (arrow (4) of FIG. 7).

The NIC 38 of the node 3-1 stores the queue element in the reception queue buffer 102, and stores the received packets in the I/O memory 34C (arrow (5) of FIG. 7). The CPU 30 references the reception queue buffer 102, and moves the packets in the I/O memory 34C to the user memory 34A (arrow (6) of FIG. 7). This allows the CPU 30 to process the received packets.

Next, RDMA Write operation will be described. RDMA includes Write operation and Read operation. In the RDMA Write operation, data in the memory of one node are directly written into the memory of another node. FIG. 8 illustrates RDMA Write packet transfer from the node 3-2 to the node 3-1.

The CPU 30 of the node 3-2 writes transfer data into the user memory 34A of the memory 34, writes a work queue element with a queue element (remote-side (reception) address) into the transmission queue buffer 100 of the NIC 38, and passes the ownership of the transfer data to the HCA 104 of the NIC 38 (arrow (1) of FIG. 8). The HCA 104 of the NIC 38 reads the transfer data in the user memory 34A, assembles the transfer data into packets, and transfers the packets to the first switch 2-1 via the link 7-3 (7-4) (arrow (2) of FIG. 8). The first switch 2-1 receives the packets, discriminates the destination address of the packets, and transfers the packets to the NIC 38 of the node 3-1 via the link 7-1 (7-2) (arrow (3) of FIG. 8).

The NIC 38 of the node 3-1 stores the queue element in the reception queue buffer 102, and writes the transfer data in the received packets into the user memory 34A (arrow (4) of FIG. 8). The CPU 30 references the reception queue buffer 102, and processes the transfer data in the received packets.

In this way, in the RDMA Write operation, the CPU 30 of the server can directly read and write data from and into the user memory 34A, and therefore a plurality of copies of the same data are not transferred between different memory spaces in the memory 34. Therefore, no CPU interrupt occurs along with the transfer operation, and overhead for data movement is offloaded from the CPU 30, which allows the CPU 30 to execute a different task to improve the process efficiency.

In the case where INFINIBAND (registered trademark) NICs, or ETHERNET (registered trademark) NICs with RDMA and TCP Offload Engine (TOE), are used in combination, substantially all the transfer protocol processing and the data movement can be offloaded from the CPU 30 to the interface hardware (NICs). Therefore, the performance of the CPU is significantly improved.

The normal packet transfer performed by the target nodes 3-1 and 3-4 and the RDMA transfer performed by the nodes 3-2, 3-3, 3-5, and 3-6, other than the target nodes 3-1 and 3-4, are executed as illustrated in FIGS. 5 and 6 to cause confliction between the normal transfer and the RDMA transfer.

FIG. 9 illustrates transfer tests performed by the respective nodes, the second switch 1, and the packet residing states in the reception queue buffers of the first switch 2-1 and the target node, with the horizontal axis representing the time T. As illustrated in FIG. 9, the confliction between the normal transfer and the RDMA transfer causes packets to reside in the reception queue buffers 102 of the target nodes 3-1 and 3-4, which results in residence of packets in the reception queue buffer 22 of the first switch 2-1, which finally leads to a state in which data transmitted from the first switch 2-1 tend to reside in the waiting queue 18A.

The RDMA Write enables high-speed and continuous data transfer through RDMA protocol control illustrated in FIG. 8. Therefore, the RDMA Write can easily apply a concentrated load to a specific port. This brings the second switch 1 to a back pressure state. The back pressure is a frame control method in which a collision is simulatively generated so that a sender temporarily suspends transmission of frames when the sender detects the collision.

The terminal device 5 of FIG. 1 monitors information on a register of the second switch 1 via the LAN 4 from the start of a load test to grasp in real time whether or not the second switch 1 is in a back pressure state.

In this way, as many packets as possible are caused to reside in a queue (transmission/reception buffer) as a ground that the second switch is reliably loaded, which generates a back pressure in the second switch to cause an error in the second switch. In an environment that enables RDMA transfer, in addition, a high load can be generated even if the second switch is a black box. It is not necessary to provide software or hardware with a special mechanism in order to generate a back pressure in the second switch 1.

In addition, by performing RDMA Write transfer as well as a normal transfer test, the target nodes can be accessed intensively to indirectly bring a queue in the second switch 1 to a back pressure state, which can reliably apply a high load to the second switch 1 in a short period.

Further, because a high load can be reliably applied to the second switch, device faults (such as in a synchronization control function) that normally could not be found can be detected to enhance the reliability of the second switch. Moreover, no special techniques are required, and thus the cost of testing at a production site or the like can be reduced. Easy operation contributes to the reduction of the device test time and cost.

(Transfer Test Process)

Figure 10:
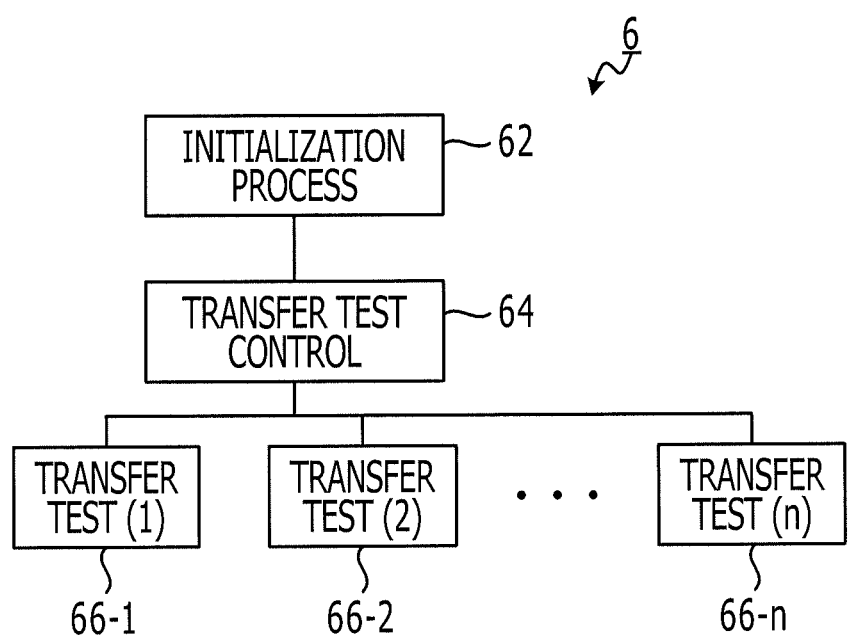
FIG. 10 illustrates the configuration of a transfer test program according to the embodiment.

FIG. 10 illustrates the configuration of the transfer test program according to the embodiment. As illustrated in FIG. 10, the transfer test program 6 includes an initialization process program 62, a transfer test control program 64, and transfer test programs 66-1 to 66-n.

The initialization process program 62 includes processes such as program area initialization and device initialization specific to the INFINIBAND (registered trademark) standard. The transfer test control program 64 controls start and stop of tests to be conducted in accordance with options specified by the user or the like. The transfer test programs 66-1 to 66-n practically perform a transfer test, and include the transfer test program 6 and a RDMA Write transfer process 60 of FIGS. 5 and 6 as functions.

Figure 11:
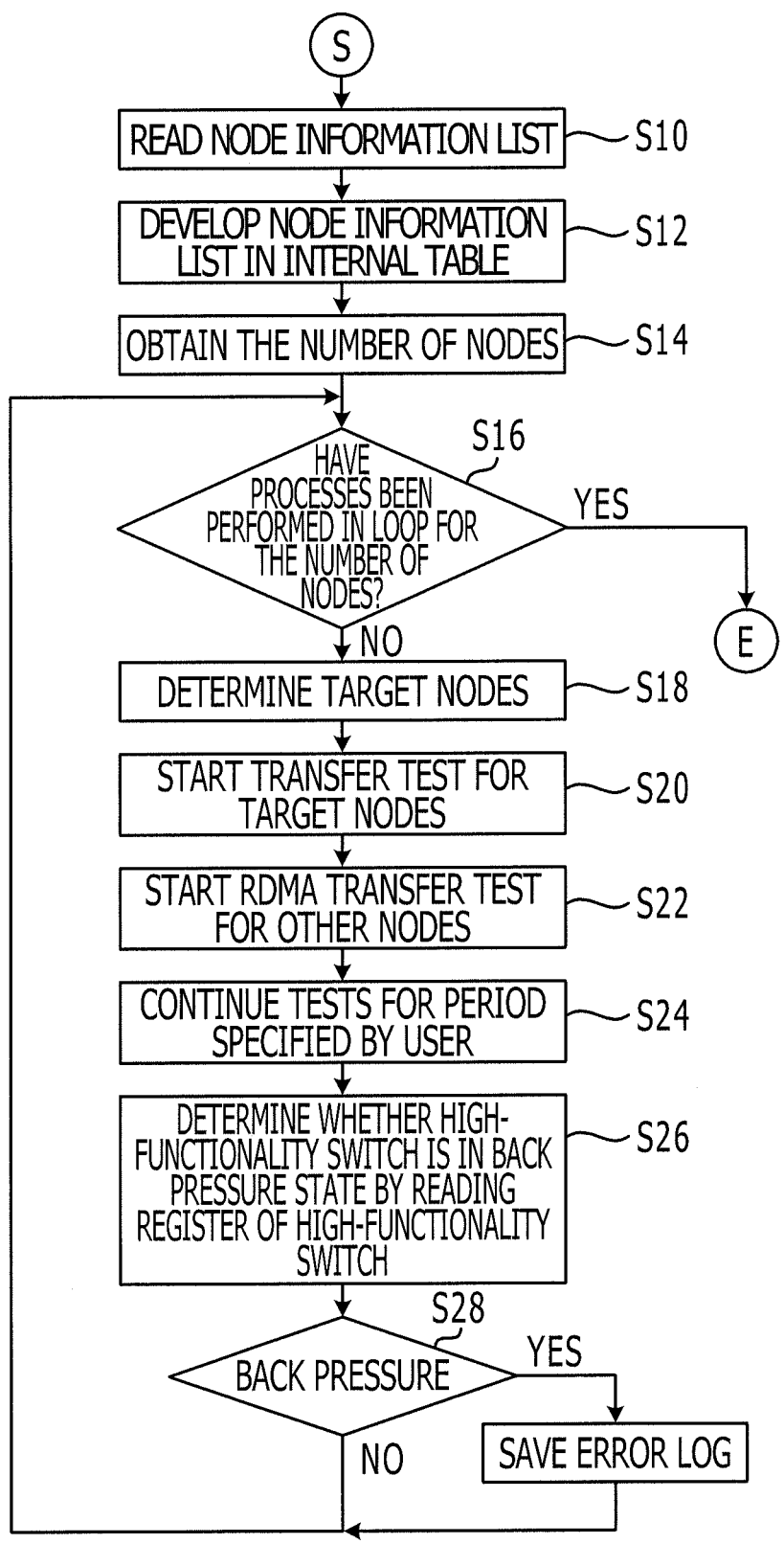
FIG. 11 is a flowchart of a test process executed by a terminal device of FIG. 1.
Figure 12:
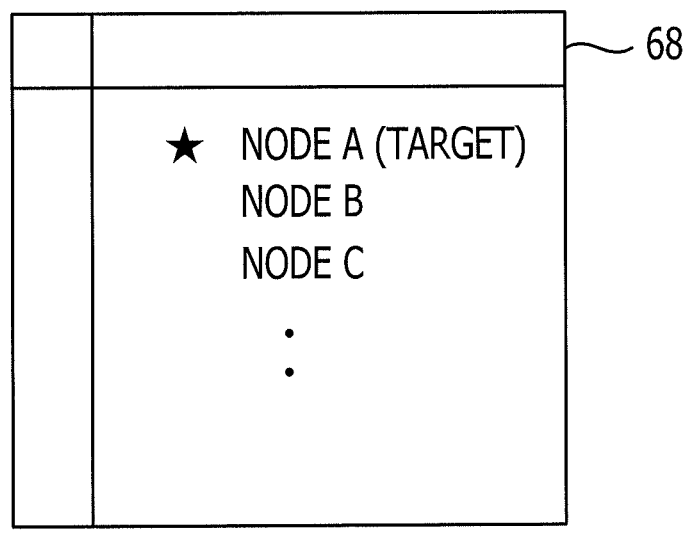
FIG. 12 illustrates an internal table of FIG. 11.
Figure 13:
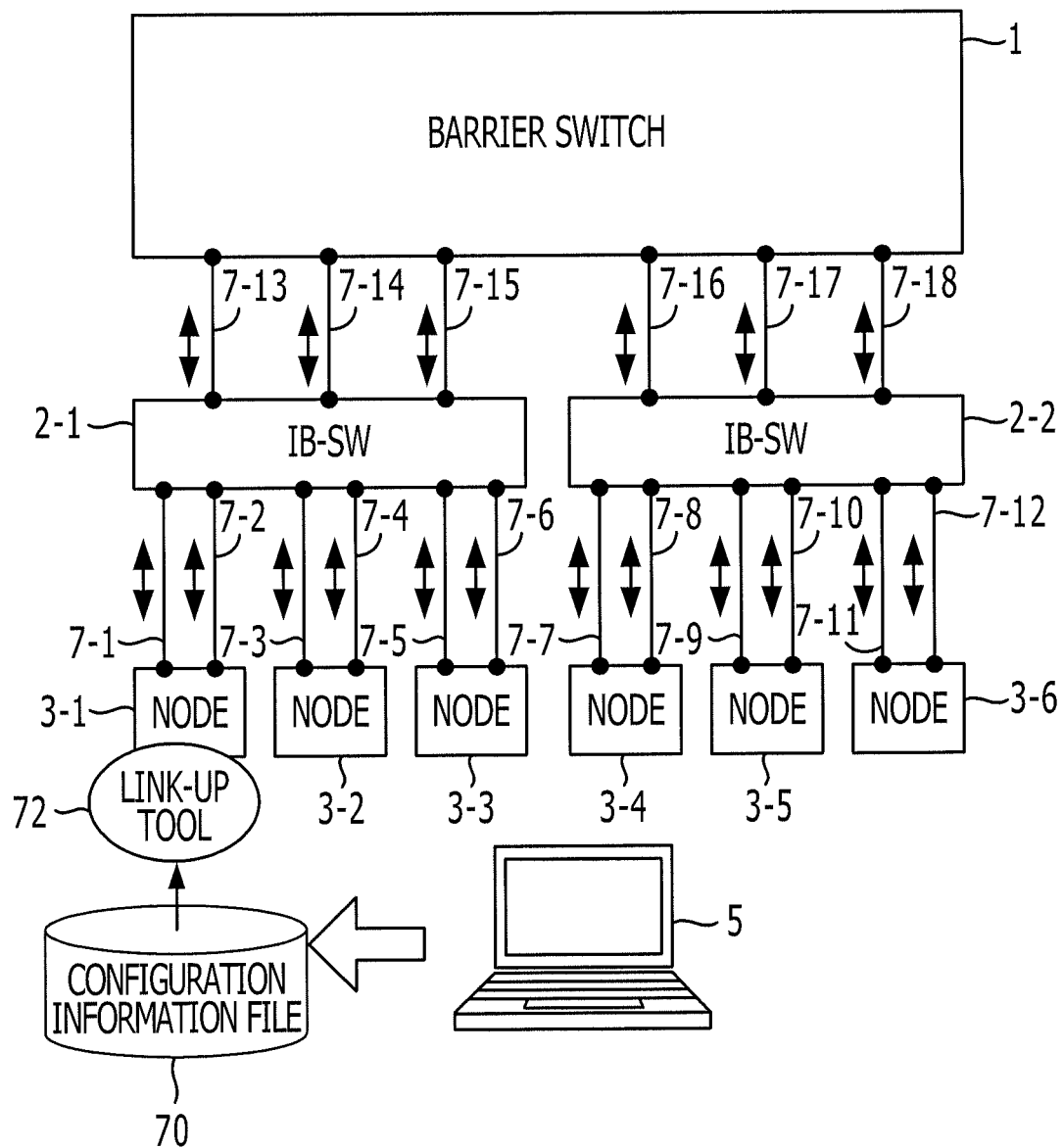
FIG. 13 illustrates a link-up process of FIG. 11.
Figure 14:
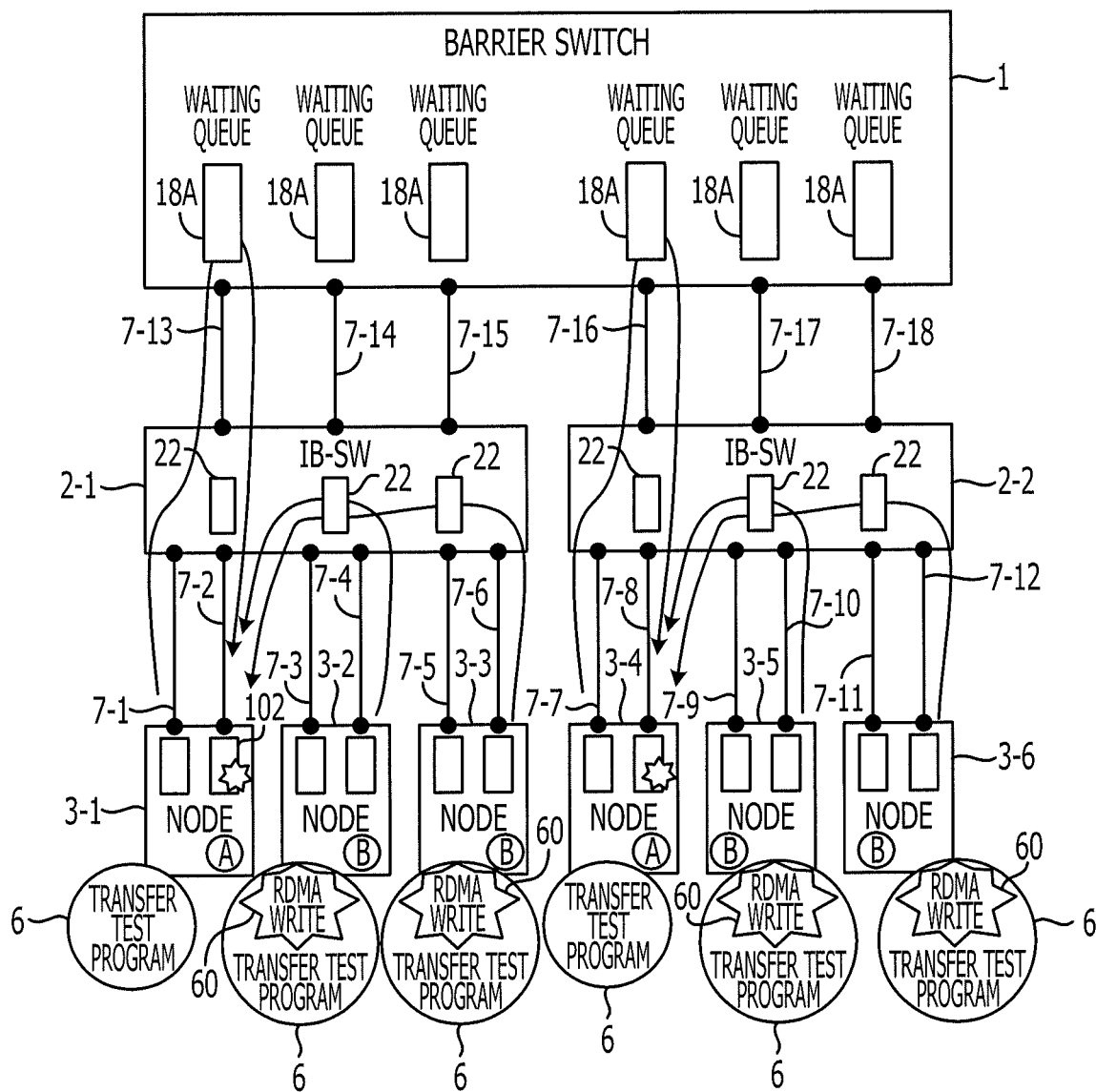
FIG. 14 illustrates operation of a transfer test of FIG. 11.

FIG. 11 is a flowchart of a test process executed by the terminal device of FIG. 1. FIG. 12 illustrates an internal table of FIG. 11. FIG. 13 illustrates a link-up process of FIG. 11. FIG. 14 illustrates operation of a transfer test of FIG. 11.

The test process of FIG. 11 will be described below with reference to FIGS. 12 to 14.

(S10) The terminal device 5 reads a node information list 68 illustrated in FIG. 12. The node information list 68 stores the identifiers of nodes to be tested.

(S12) The terminal device 5 develops the read node information list 68 in an internal table in a memory.

(S14) The terminal device 5 loads the transfer test program 6 illustrated in FIG. 10 into each of the nodes 3-1 to 3-6 designated in the node information list 68 via the LAN 4. This causes each of the nodes 3-1 to 3-6 to perform the initialization process 62. Next, as illustrated in FIG. 13, the terminal device 5 transfers a configuration information file 70 defined by the user to each of the nodes 3-1 to 3-6 designated in the node information list 68 via the LAN 4. Each of the nodes 3-1 to 3-6 executes a link-up tool (program) 72 to perform a link-up process between the node and the corresponding first switch and between the corresponding first switch and the second switch based on the configuration information file 70. When link-up is completed for all the connections, transfer (communication) is enabled.

In a user environment, in general, a node executes firmware to automatically perform a link-up process. In the embodiment, the system is in a test environment. Therefore, it is often the case that no firmware is installed, and an initialization process is performed in a unique way. It is a matter of course that such a link-up process is not necessary if firmware is installed. Then, the terminal device 5 starts transfer control. First, the terminal device 5 obtains the number of nodes to be tested from the node information list 68.

(S16) The terminal device 5 determines whether or not processes have been performed in a loop for the number of the nodes. If processes have been performed in a loop for the number of the nodes, the transfer test is terminated.

(S18) If it is determined that processes have not been performed in a loop for the number of the nodes, the terminal device 5 determines a node to be targeted. The node to be targeted may be designated by using an input device such as a mouse on the node information list 68 displayed on the screen of the terminal device 5, for example. As illustrated in FIG. 12, a star mark is placed in front of a node A which is designated.

(S20) The terminal device 5 commands a transfer test for the designated target node (in FIGS. 5 to 9, the nodes 3-1 and 3-4) via the LAN 4, designating a path that passes through a port of the second switch 1 with a waiting queue in which a back pressure is to be generated. As illustrated in FIG. 14, the specified target nodes 3-1 and 3-4 respectively transmit packets for normal testing to the first switches 2-1 and 2-2. The normal test packets are designated to be addressed to the corresponding target node itself, and to pass through the corresponding first switch and the second switch.

(S22) The terminal device 5 commands RDMA Write transfer for the nodes 3-2, 3-3, 3-5, and 3-6, other than the target nodes 3-1 and 3-4, with the target nodes 3-1 and 3-4 designated as the destination addresses. As illustrated in FIG. 14, the nodes 3-2, 3-3, 3-5, and 3-6, other than the target nodes 3-1 and 3-4, perform RDMA Write transfer with the target nodes 3-1 and 3-4 designated as the destination addresses.

(S24) The terminal device 5 continuously performs the processes of S20 and S22 for a period specified by the user.

(S26) When the period specified by the user elapses, the terminal device 5 reads a register for the state of the second switch 1 via the LAN 4 to determine whether or not the second switch 1 is in a back pressure state.

(S28) If the second switch 1 is in a back pressure state, the terminal device 5 saves a log of the target node and the error. If the second switch 1 is not in a back pressure state, in contrast, the terminal device 5 saves no log. Then, the terminal device 5 returns to the process of FIG. 16.

In this way, no special techniques are required, and thus the cost of testing at a production site or the like can be reduced. Easy operation contributes to the reduction of the device test time and cost. In addition, the performance of the second switch device, the characteristics of the synchronization interrupt process, and an error can be determined based on an error log targeted at each node.

Other Embodiments

Figure 15:
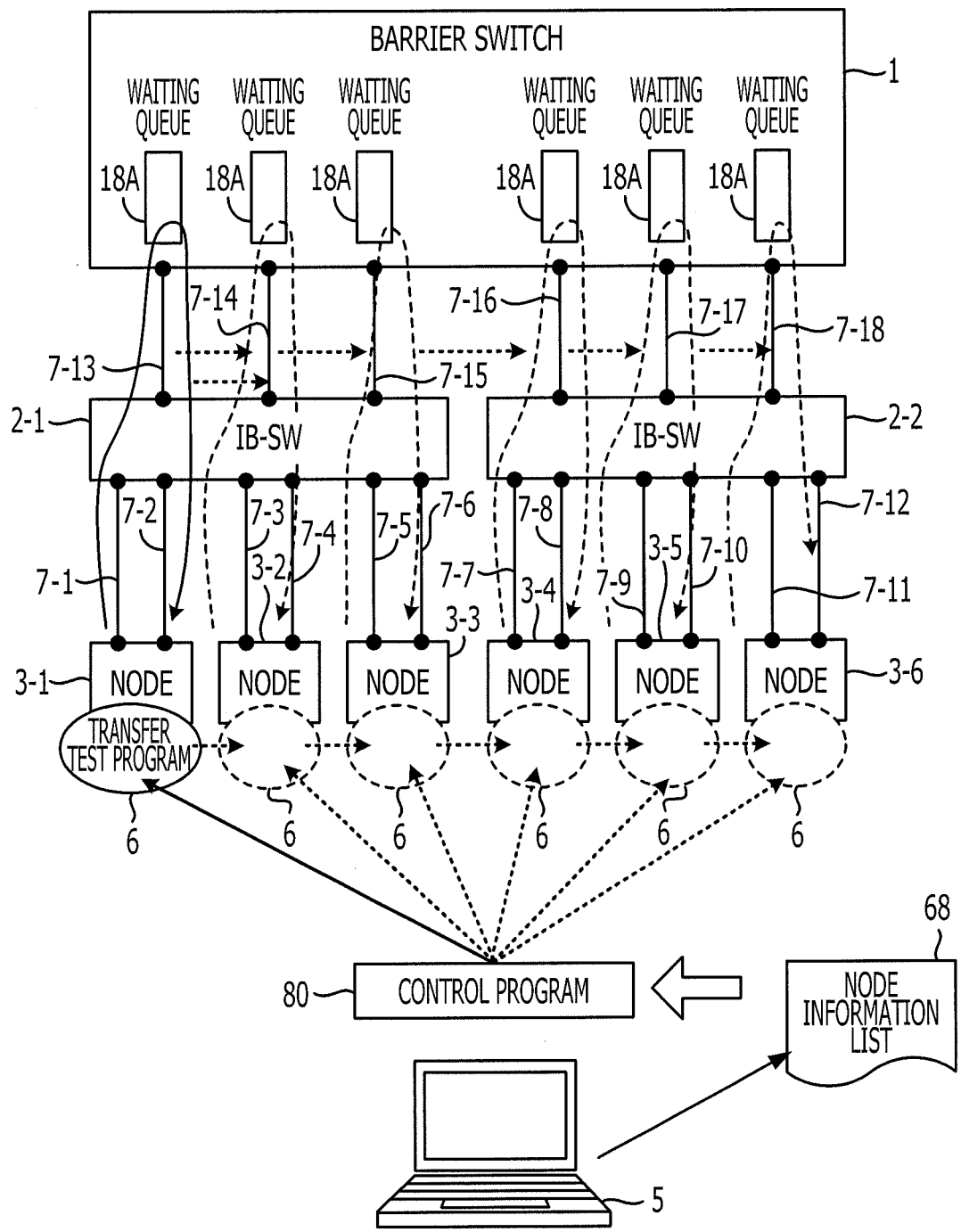
FIG. 15 illustrates a load test method for a network system according to another embodiment.

FIG. 15 illustrates a load test method according to another embodiment. Components in FIG. 15 that are the same as those in FIGS. 1 to 14 are denoted by the same reference numerals. In the embodiment of FIG. 11, the user conducts a test for each test configuration targeted at a specific waiting queue in the second switch 1.

In the embodiment of FIG. 15, the terminal device 5 is provided with a control program 80 that manages all the nodes. By executing the control program 80, the terminal device 5 references the node information list 68 to automatically control the testing order and so forth. That is, the control program 80 automatically performs back pressure load tests targeted at all the ports of the second switch 1.

This eliminates the need for the user to specify a node and a test period, which contributes to further reduction of man-hours and improvement of the reliability of the device.

In the embodiment discussed earlier, the transmission queue buffer 100 and the reception queue buffer 102 are provided in the NIC 38. However, the transmission queue buffer 100 and the reception queue buffer 102 may be provided in the I/O memory 34C of the memory 34. In the above embodiment, moreover, a back pressure is generated by residence of packets in a reception queue. However, a back pressure may be generated by residence of packets in a reception buffer that stores received data.

In the above embodiment, further, six nodes are provided for reception queues. However, several thousands of nodes may be provided in an HPC system, for example. A more significant improvement in test efficiency can be expected as the number of nodes is larger. Likewise, while two first switches and one second switch are provided in the above embodiment, the present invention is not limited thereto.

In the above embodiment, INFINIBAND (registered trademark) NICs, or ETHERNET (registered trademark) NICs with RDMA and TCP Offload Engine (TOE), are used for link connections. However, other communication standards that employ RDMA may be employed.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media includes a carrier-wave signal. The media described above may be non-transitory media.

While the present invention has been described above by way of embodiments, various modifications may be made to the present invention without departing from the scope and spirit of the present invention. Such modifications should not be excluded from the scope of the present invention.

What is claimed is:

1. A load test method for a network system, the network system including a plurality of node devices, a first switch device coupling to the plurality of node devices, and a second switch device coupling to the first switch device, the first switch device being located between the plurality of node devices and the second switch device, the method comprising:
    transmitting a plurality of first packets from a first node device among the plurality of node devices to the first switch device, the plurality of first packets being addressed to the first node device itself via both the first switch device and the second switch device;
    transmitting a plurality of second packets from a second node device among the plurality of node devices to the first switch device, in parallel with the transmitting of the plurality of first packets from the first node device to the first switch device, the plurality of second packets being addressed to the first node device via the first switch device without being routed through the second switch device;
    storing the first packets received from the second switch device and the second packets received from the second node device in a queue buffer and thereafter transferring the first packets and the second packets to the first node device by the first switch device; and
    monitoring state information based on a number of packets waiting to be exchanged in the second switch device.

2. The load test method for a network system according to claim 1,
wherein transmitting a plurality of second packets to the first switch device includes performing Remote Direct Memory Access (RDMA) transfer of the plurality of second packets to the first switch device by the second node device.

3. The load test method for a network system according to claim 1, wherein transmitting a plurality of first packets to the first switch device includes:
transferring the plurality of first packets transmitted by the first node device to the second switch device by the first switch device;
storing the first packets in an exchange waiting queue buffer and thereafter transferring the first packets to the first switch device by the second switch device; and
storing the first and second packets received from the first switch device in a queue buffer by the first node device.

4. The load test method for a network system according to claim 3,
wherein storing the first packets in an exchange waiting queue buffer and thereafter transferring the first packets to the first switch device by the second switch device includes, by the second switch device, performing inter-node synchronization control on the packets in the exchange waiting queue buffer and transferring the first packets that have undergone the synchronization control to the first switch device.

5. The load test method for a network system according to claim 2,
wherein performing RDMA transfer of the plurality of second packets to the first switch device by the second node device includes directly transferring transfer data in a memory of the second node device to a memory of the first node device via the first switch device.

6. A non-transitory computer-readable medium encoded with a computer program for performing a load test for a network system, the network system including a plurality of node devices, a first switch device coupling to the plurality of node devices, and a second switch device coupling to the first switch device, the first switch device being located between the plurality of node devices and the second switch device, the program when executed by a computer causes the computer to perform a method comprising:
transmitting a plurality of first packets from a first node device among the plurality of node devices to the first switch device, the plurality of first packets being addressed to the first node device itself via both the first switch device and the second switch device;
transmitting a plurality of second packets from a second node device among the plurality of node devices to the first switch device, in parallel with the transmitting of the plurality of first packets from the first node device to the first switch device, the plurality of second packets being addressed to the first node device via the first switch device without being routed through the second switch device;
storing the first packets received from the second switch device and the second packets received from the second node device in a queue buffer and thereafter transferring the first packets and the second packets to the first node device by the first switch device; and
monitoring state information based on a number of packets waiting to be exchanged in the second switch device.

* * * * *

UNITED STATES PATENT AND TRADEMARK OFFICE
CERTIFICATE OF CORRECTION

| | | |
|---|---|---|
| PATENT NO. | : 8,804,543 B2 | Page 1 of 1 |
| APPLICATION NO. | : 13/076090 | |
| DATED | : August 12, 2014 | |
| INVENTOR(S) | : Kazunari Gotou | |

It is certified that error appears in the above-identified patent and that said Letters Patent is hereby corrected as shown below:

In the Claims

Column 11, Line 33, In Claim 5, delete "includes directly" and insert -- includes --, therefor.

Signed and Sealed this
Eleventh Day of November, 2014

Michelle K. Lee
*Deputy Director of the United States Patent and Trademark Office*